United States Patent
Mory et al.

(10) Patent No.: US 6,882,991 B2
(45) Date of Patent: Apr. 19, 2005

(54) SEARCH METHOD IN A HIERARCHICAL OBJECT STRUCTURE

(75) Inventors: Benoit Mory, Paris (FR); Nicolas Santini, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 418 days.

(21) Appl. No.: 09/995,489

(22) Filed: Nov. 28, 2001

(65) Prior Publication Data

US 2002/0073054 A1 Jun. 13, 2002

(30) Foreign Application Priority Data

Nov. 28, 2000 (FR) .............................................. 00 15352

(51) Int. Cl.⁷ ............................. G06E 1/00; G06F 17/00
(52) U.S. Cl. ......................................... 706/26; 706/50
(58) Field of Search ..................................... 706/26, 50

(56) References Cited

U.S. PATENT DOCUMENTS 5,832,182 A    11/1998  Zhang et al. .................. 706/50

FOREIGN PATENT DOCUMENTS

WO    WO9923578    10/1998    ........... G06F/17/30

OTHER PUBLICATIONS

Khaled Alsabti et al, "An Efficeint K–Means Clustering Algorithm", IPPS/SPDP Workshop on High Performance Data Mining, 1998, Orlando FL.

S. Pramanik et al; "An Efficient Searching Algorithm for Approximate Nearest Neighbor Queries in the Dimensions", Proceedings of ICMCS99: IEEE Multimedia Systems '99: International Conference on Multimedia Comuting and Systems, Florence, Italy, Jun. 7–11, 1999, pp. 865–869, vol. 1, XP002174907.

*Primary Examiner*—George Davis

(57) ABSTRACT

The invention relates to a method of searching a predetermined number of objects which are closest to an example, in a hierarchical object structure which is obtained by using a hierarchical object classification method.

Figure 1:
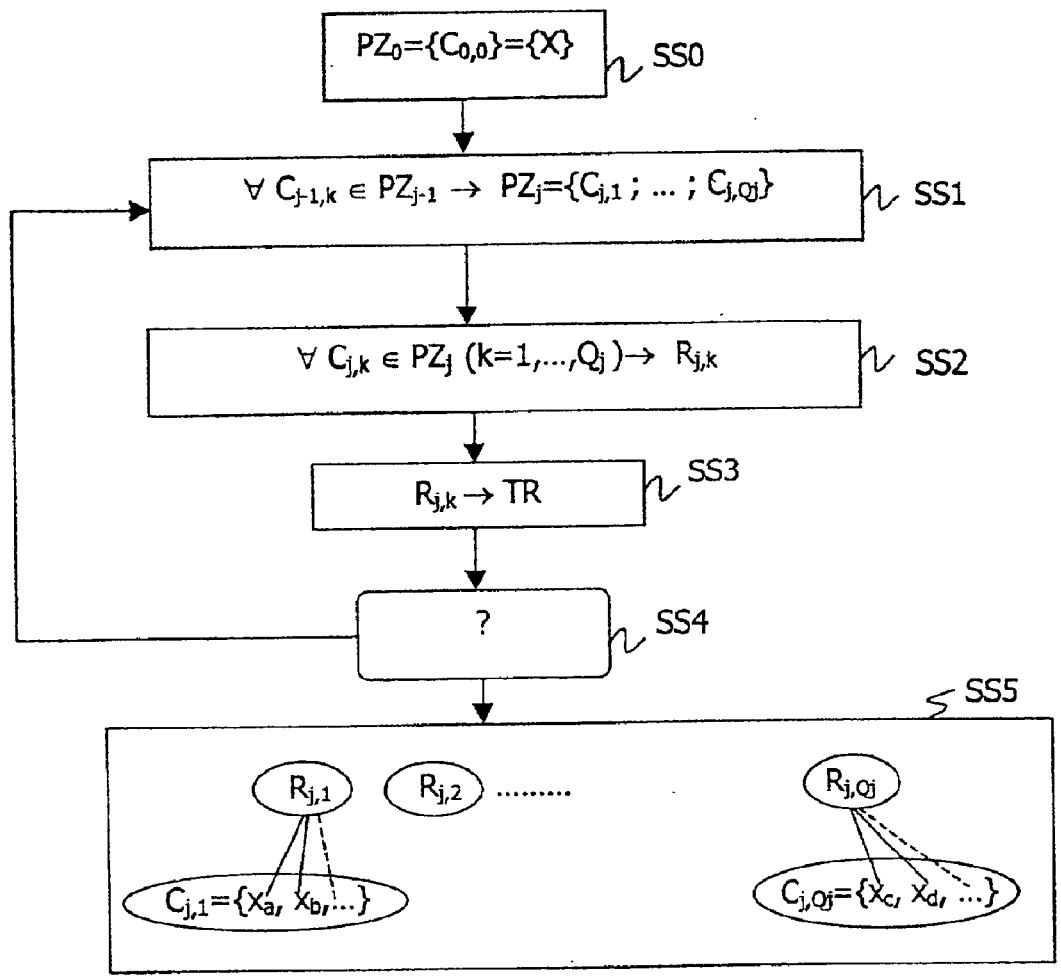

The proposed method consists of going through the hierarchical structure starting from the root, descending as far as the first node closest to the searched example of which a number of leaves lower than the number of lacking results depend, and then going back up to the brother node of this node which is closest to the searched example, so as to add other results and so on and so forth until said predetermined number is arrived at. Application: MPEG-7 descriptions.

9 Claims, 3 Drawing Sheets

SEARCH METHOD IN A HIERARCHICAL OBJECT STRUCTURE

The invention relates to a method of searching in a set of objects a predetermined number of objects that are closest to an example. The invention also relates to a computer program and equipment comprising means for implementing such a search method. The invention finally relates to a transmission system comprising such equipment.

The invention has interesting applications in the field of the use of audio/video data.

The data transmission and storage capacities increase considerably, so that in a great variety of fields including the field of consumer electronics, the user henceforth has difficulty managing the information he has at his disposal. In this context, the object search methods grow ever more important.

U.S. Pat. No. 5,832,182 describes data partitioning methods and discusses the interest of such search methods. The data partitioning in effect permits to reduce the number of comparisons to be made for making a search, and thus the processing time necessary for the search.

The invention notably has for its object to propose an efficient object search method of using an object partitioning at various levels.

A search method according to the invention is characterized in that, for searching in a set of objects a predetermined number of objects which are closest to an example, by utilizing a multilevel partition which has a tree-like structure comprising nodes and leaves, the nodes containing elements representing classes of objects and the leaves containing objects, said method comprises the following steps:

a step of passing through said tree-like structure starting from a node and going to the leaves by passing through the nodes whose representative elements are closest to the example, for selecting one or various leaves, a step of testing whether the number of selected leaves is lower than said predetermined number of objects, and, if the number of selected leaves is lower than said predetermined number of objects, a new repetition of said steps starting from the brother node of the node passed through last, closest to said example.

The use of a multilevel partition is particularly advantageous for making a search, because it permits to further reduce the number of comparisons necessary for the search and thus the processing time. It also permits to process sets comprising a much larger number of objects than with a single-level partition. Indeed, with a single-level partition, when the size of the set of objects significantly increases, this leads either to the increase of the number of classes, or to the increase of the number of objects contained in one class. In both cases one is led to compare the example searched for to a much larger number of objects. The processing time thus increases considerably. On the other hand, with a multilevel partition, the example searched for is only compared to a limited number of objects at each level of the partition. The increase of the size of the set thus has much less influence on the processing time of the search.

The invention advantageously proposes to pass through the tree-like structure of a multilevel partition.

In an advantageous embodiment of the invention the predetermined number of objects is a multiple of a predetermined number of results and said method comprises an additional selection step for retaining from the selected leaves only a number of leaves equal to said predetermined number of results, while the retained leaves are those that contain the objects that are closest to said example.

The partition of the objects results in a reduction of the number of comparisons to be made for making a search. But it necessarily causes a deterioration of the results of the search. This embodiment permits to limit this deterioration. Indeed, by first selecting a number of leaves higher than the desired number of results, and thereafter making a complementary selection, for example, by an exhaustive comparison of the objects contained in the selected leaves to the example searched for the quality of the results obtained is notably improved.

In a general way the invention may be applied to any type of object provided that a measure of similarity is defined for this type of objects, that this measure of similarity is that which has been used for constructing the partition, and that it verifies the 3 following conditions:

f is an application which associates a real number with two objects of the initial set, this real number is identical with whatever order in which the two objects are considered, the real number associated with two identical objects is higher than the real number associated with two different objects.

The objects are formed, for example, by metadata, that is to say, structures which combine a set of data. Such metadata are, for example, descriptions of video shots, notably descriptions of the MPEG-7 type. The MPEG-7 draft indeed defines a certain number of descriptors for video shots (color descriptors, text descriptors, camera movement descriptors, . . . ), and proposes similar measures associated with these descriptors. For more details reference is made to the document ISO/IEC JTC1/SC29/WG11 N3521 (July 2000) entitled <<Coding of moving pictures and associated audio information>> which refers to the document <<Visual Working Draft>> version 4.0.

These and other aspects of the invention are apparent from and will be elucidated, by way of non-limitative example, with reference to the embodiment(s) described hereinafter.

Figure 2:
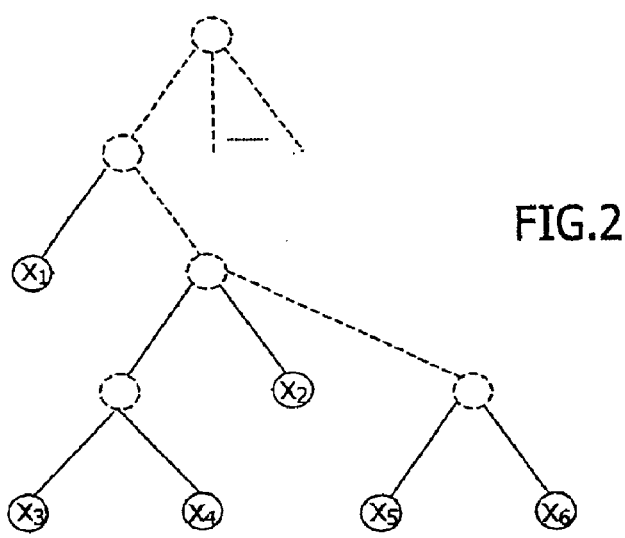
Figure 3:
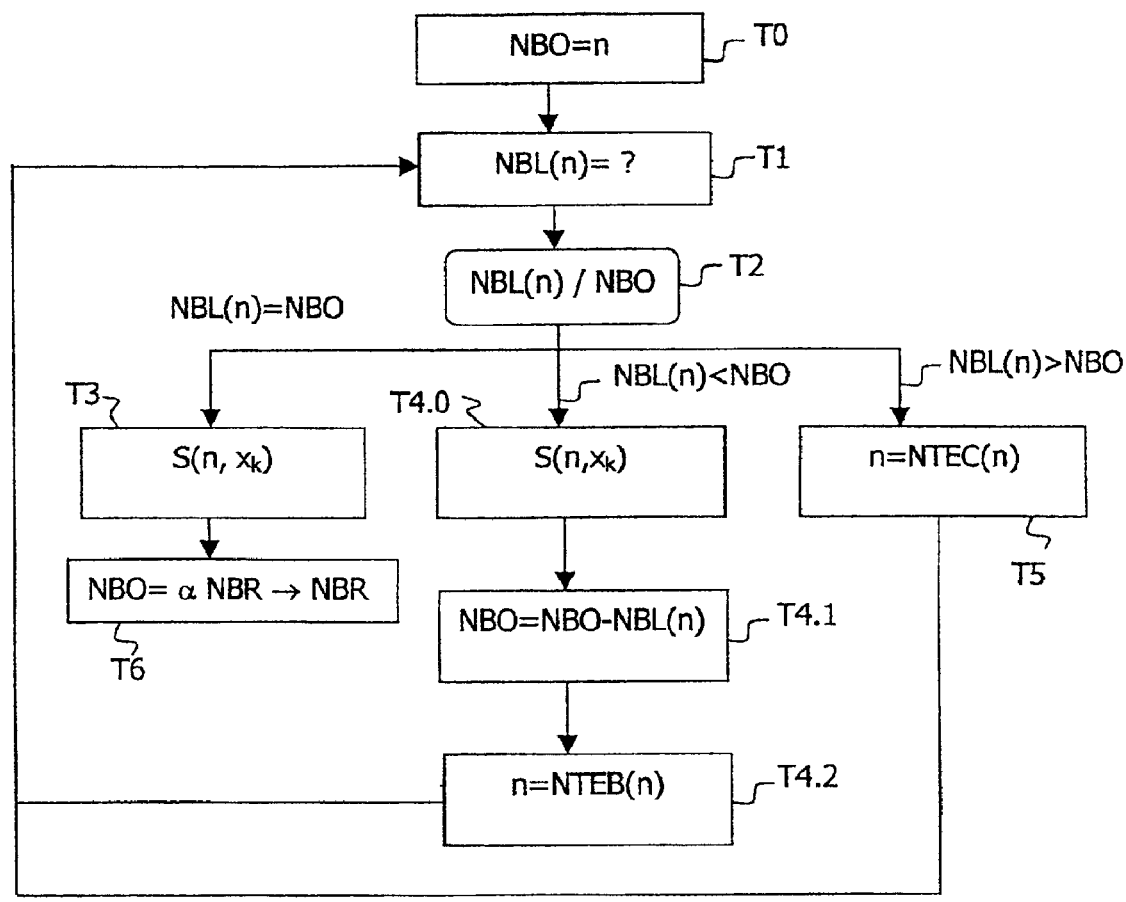
Figure 4:
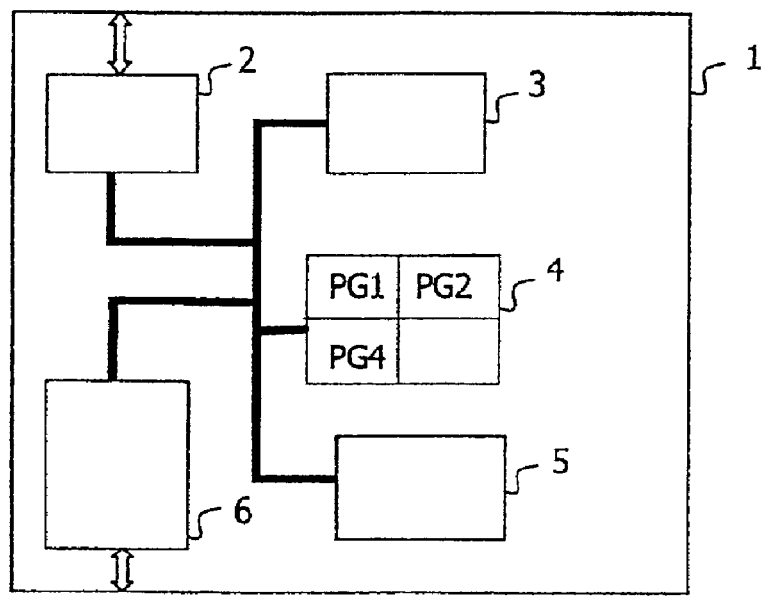
Figure 5:
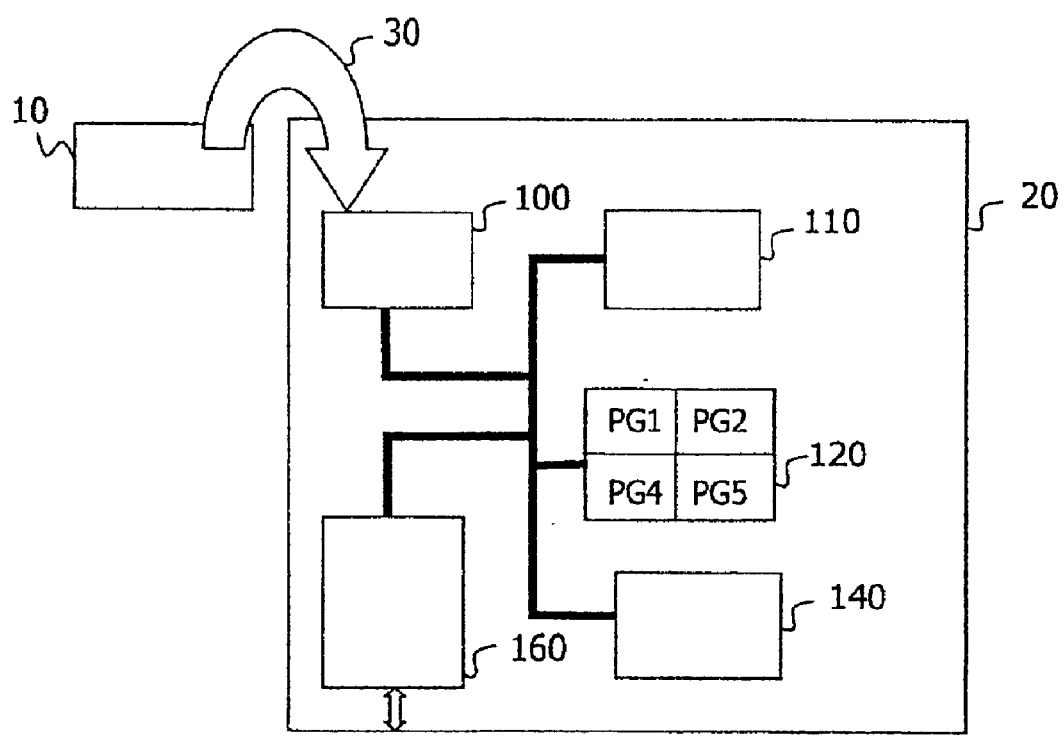

In the drawings:

FIG. 1 is a block diagram describing the operation of an example of a method of partitioning a set of objects, which provides a multilevel partition which may be used by a search method according to the invention, FIG. 2 is a diagram of an example of a tree-like structure used for implementing a search method according to the invention, FIG. 3 is a block diagram describing the operation of an example of a search method according to the invention, FIG. 4 is a diagram of an example of equipment according to the invention, and FIG. 5 is a diagram of an example of a transmission system according to the invention.

In FIG. 1 is shown a block diagram describing the operation of an example of a multilevel partitioning method intended to produce a multilevel partition of the type used by a search method according to the invention.

The partitioning method shown in FIG. 1 comprises the following steps:

(SS0): An initial partition $PZ_0$ is defined. This partition comprises a class $C_{0,0}$ which contains all the objects of the set X.

(SS1): A partition $PZ_j$ is created for each class $C_{j-1,k}$ (k=1, ... $Q_{j-1}$) of the partition $PZ_{j-1}$ which contains more than one object. This partition comprises $Q_j$ classes $C_{j,1}$, $C_{j,2}$, ... $C_{j,Qj}$.

(SS2): A representative element $R_{j,1}$, $R_{j,2}$, ... , $R_{j,Qj}$ is determined for each class $C_{j,1}$, $C_{j,2}$, ... , $C_{j,Qj}$ of the partition $PZ_j$.

(SS3): These representative elements are stored in a tree-like structure TR of such kind that each representative element $R_{j,1}, R_{j,2}, \ldots, R_{j,Qj}$ is a son of the representative element of the class $C_{j-1,k}$.

(SS4): The steps (SS1), (SS2) and (SS3) are repeated until the partition $PZ_j$ verifies a predetermined criterion.

(SS5): When the predetermined criterion is verified, the objects of the classes $C_{j,1}, C_{j,2}, \ldots, C_{j,Qj}$ are stored so as to form the leaves of the nodes $R_{j,1}, R_{j,2}, \ldots, R_{j,Qj}$, respectively.

In step (SS1) one may use, for example, a partitioning method of the type <<K-Means>> as described in the article <<An efficient K-means clustering algorithm>> by K. Alsabti, S. Ranka and V. Singh, published on the occasion of <<IPPS/SPDP Workshop on High Performance Data Mining, 1998, Orlando Fla.>>. Also a hierarchical partitioning method via agglomeration may be used such as described in the introduction of cited United States patent, or also a combination of the two methods, a partial agglomeration method which is used for initializing a <<K-means>> method.

The representative element of the class is, for example, the centroid of the class. For determining the centroid of a class, first a fictitious element which has the same similarity with all the elements of the class is calculated. The centroid is formed by the element of the class that is closest to this fictitious element.

The multilevel partitioning method is terminated (that is to say, the predetermined condition is considered verified) either when the number of objects per class is closest possible to a maximum value, or when the objects contained in the classes of the partition $PZ_j$ are sufficiently close to the centroid of the class.

In FIG. 2 is shown an example of a tree-like structure TR obtained with such a multilevel partitioning method and which may be used for implementing a search method according to the invention. The nodes of the tree are represented in dashed lines. They contain an element that represents a class of the set of objects. The leaves of the tree are represented in solid lines. They contain the objects $x_1, \ldots, X_N$ of the set X.

FIG. 3 shows a block diagram describing the operation of an example of a search method according to the invention for selecting a predetermined number of objects N in a tree-like structure Y. According to FIG. 3 a search method according to the invention comprises the following steps:

(T0): A variable NBO, which indicates the number of leaves that remain to be selected, is initialized. Its initial value is equal to the predetermined number of objects to be selected NBO=n.

(T1): The number of leaves NBL(n), which depend on the current node n, is determined. The leaves which depend on a node are the leaves of this node as well as the leaves of the nodes that depend on this node.

(T2): The number of leaves, which depend on the current node NBL(n), is compared with the number of leaves that remain to be selected NBO.

(T3): If they are the same (NBL(n)=NBO), the leaves depending on the current node n are selected (this selection operation is denoted $S(n,x_k)$ in FIG. 3). And the method is terminated.

(T4.0): If the number of leaves NBL(n) is lower than the number of leaves that remain to be selected (NBL(n)<NBO), the leaves depending on the current node n are selected ($S(n,x_k)$).

(T4.1): The variable NBO, which indicates the number of leaves that remain to be selected, is updated in that the number of leaves NBL(n) are subtracted from the current number of leaves that remain to be selected: NBO=NBO−NBL(n).

(T4.2): The brother of the current node that is closest to the example, denoted NTEB(n), becomes the new current node: n=NTEB(n), and the step (T1) is repeated.

(T5): If the number of leaves NBL(n) is higher than the number of leaves that remain to be selected (NBL(n)>NBO), the son of the current node that is closest to the example, denoted NTEC(n), becomes the new current node: n=NTEC(n), and the step (T1) is repeated.

Advantageously, the number of objects to be selected NBO is set equal to a multiple of the number of results NBR desired by the user: NBO=α.NBR. In this case the search method according to the invention comprises an additional step (T6) for retaining from the selected α.NBR objects only the NBR objects that are closest to the example searched for. For example, this additional selection, which is made in step (T6), consists of a systematic comparison of the α.NBR objects contained in the leaves selected with the example searched for.

The proximity of two objects is evaluated by using a measure of similarity f which depends on the type of objects concerned, which is the one that has been used for building the tree-like structure, and which satisfies the following three conditions:

f is an application which associates a real number with two objects of the initial set, this real number is identical whatever the order in which the two objects are considered, the real number associated with two identical objects is higher than the real number associated with two different objects.

The invention is notably applied to objects which are instances of descriptors defined in the draft of the MPEG-7 standard, by utilizing the measures of associated similarities which are proposed in this draft of the MPEG-7 standard.

FIG. 4 shows an example of equipment according to the invention. This equipment is a camera 1 which comprises video capturing means 2 (for example of the CCD type). The camera 1 also comprises a memory 3 for storing data and a memory 4 for storing computer programs, a microprocessor assembly 5 for executing said programs, and a user interface 6 for receiving commands given by the user and for supplying data to the user. The memory 4 notably contains a set PG1 of one or various programs for coding the captured video. This set of programs PG1 notably delivers descriptions of MPEG-7 video shots which are stored in the memory 3. The memory 4 also contains:

a multilevel partitioning method PG2 of a set formed by various of said MPEG-7 descriptions, a search program PG4 according to the invention for searching in a tree-like structure that contains said descriptions.

In FIG. 5 is shown a diagram of an example of a transmission system according to the invention. Such a system comprises a data source 10, user equipment 20 and a medium 30 for transporting signals between the data source 10 and the user equipment 20. The data source 10 is, for example, a video data source. The transmission medium, which transmits these video data to the user equipment, is formed, for example, by a cable network, a transmission network via satellite, a radio link . . . . The user equipment comprises a receiving circuit 100 notably used for receiving data transmitted by the source 10, a memory 110 for storing data, notably received data, a memory 120 which contains computer programs, a microprocessor assembly 140 for executing said programs, and a user interface 160 for receiving commands given by the user and for supplying data to the user. The memory 120 notably contains a program PG5 for putting together, based on received video data, a database of objects which are MPEG-7 descriptions relating to video shots. It also contains a program PG2 of multilevel partitioning of a set comprising objects of this database, and a program PG4 according to the invention for searching objects in a tree-like structure that contains said descriptions.

What is claimed is:

1. A method of searching in a set of objects a predetermined number of objects that are closest to an example, by utilizing a multilevel partition which has a tree-like structure comprising nodes and leaves, the nodes containing elements representing classes of objects, and the leaves containing objects, said method comprising the execution of the following steps in a repetitive manner:

passing through said tree-like structure starting from a node and going to the leaves by passing through the nodes whose representative elements are closest to the example, for selecting one or various leaves;

testing whether the number of selected leaves is lower than said predetermined number of objects; and if the number of selected leaves is lower than said predetermined number of objects, a new repetition of said steps starting from the brother node of the node passed through last, closest to said example, otherwise providing the selected leaves having said predetermined number of objects as an output being sufficiently close to a centroid of a class of objects.

2. A search method as claimed in claim 1, characterized in that the predetermined number of object is a multiple of a predetermined number of results, which further comprises retaining from the selected leaves only a number of leaves equal to said predetermined number of results, the retained leaves being those that contain the objects closest to said example.

3. A search method as claimed in claim 1, characterized in that the step of passing through the tree-like structure comprises a test for verifying for each node passed through if the number of leaves connected to this node is lower than or equal to the number of objects to be selected, in which case the leaves connected to this node are selected directly without passing by any possible intermediate nodes.

4. A search method as claimed in claim 1, characterized in that said objects are descriptions of video shots.

5. A search method as claimed in claim 1, characterized in that said objects are MPEG-7 descriptions.

6. A search method as claimed in claim 1, characterized in that a proximity of the representative elements or objects to the example searched for is determined by using a measure of similarity f which is the one that has been used for constructing the partition used and which verifies the following properties:

f is an application which associates a real number with two data of the initial set;

this real number is identical whatever the order of the two data; and the real number associated with two identical data is higher than the real number associated with two different data.

7. A computer program on a computer-readable medium containing code for performing a method of searching in a set of objects a predetermined number of objects that are closest to an example, by utilizing a multilevel partition which has a tree-like structure comprising nodes and leaves, the nodes containing elements representing classes of objects, and the leaves containing objects, said program comprising:

code for passing through said tree like structure starting from a node and going to the leaves by passing though the nodes whose representative elements are closest to the example, for selecting one or various leaves;

code for testing whether the number of selected leaves is lower than said predetermined number of objects; and code for determining if the number of selected leaves is lower than said predetermined number of objects, a new repetition of said steps starting from the brother node of the node passed through last, closest to said example, and code for providing the selected leaves having said predetermined number of objects as an output being sufficiently close to a centroid of a class of objects.

8. A hierarchical search apparatus, comprising:

video capturing means;

a first memory for storing data;

a second memory for storing computer-executable code;

a microprocessor in communication with the video capturing means and the first memory and second memory, said microprocessor being adapted for executing the computer-executable code in the second memory;

wherein the data in the first memory comprises descriptions of metadata video shots captured by the video capturing means;

wherein the second memory comprises means for coding a video captured by the video capturing means and means for multilevel partitioning of a set of descriptions of various metadata video shots obtained from said first memory; and means for searching in a tree-like structure comprising the various metadata video shot descriptions.

9. A transmission system including the hierarchical search apparatus according to claim 8, said transmission system further comprising:

the hierarchical search apparatus being adapted for transmission to/from the search apparatus;

a data source adapted for transmission to/from the data source; and a transmission medium adapted for providing at least a transmission path between the search apparatus and the data source.

* * * * *